US006289151B1

(12) United States Patent
Kazarinov et al.

(10) Patent No.: US 6,289,151 B1
(45) Date of Patent: Sep. 11, 2001

(54) ALL-PASS OPTICAL FILTERS

(75) Inventors: Rudolf Feodor Kazarinov, Bethlehem Township, Northampton County, PA (US); Gadi Lenz, Fanwood, NJ (US); Christi Kay Madsen, South Plainfield, NJ (US); Ronald Edward Scotti, White House Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/182,980

(22) Filed: Oct. 30, 1998

(51) Int. Cl.[7] .............................. G02B 6/26; H04J 14/02
(52) U.S. Cl. ............................ 385/32; 385/24; 385/27; 359/127
(58) Field of Search ................................ 385/24, 37, 27, 385/30, 32; 359/127, 130, 119

(56) References Cited

U.S. PATENT DOCUMENTS

| 4,768,850 |   | 9/1988  | Moslehi et al. ............... 350/96.15 |
|-----------|---|---------|------------------------------------------|
| 4,934,777 | * | 6/1990  | Jou et al. ...................... 350/96.15 |
| 5,557,468 |   | 9/1996  | Ip .                                     |
| 5,838,851 |   | 11/1998 | Wisseman et al. .                        |
| 5,903,691 | * | 5/1999  | Wisseman et al. ................ 385/37 |
| 5,943,457 | * | 8/1999  | Hayward et al. .................. 385/24 |

FOREIGN PATENT DOCUMENTS

| 0 426 357 A2 | 5/1991 | (EP) . |
| 0 426 357 A3 | 5/1991 | (EP) . |

OTHER PUBLICATIONS

Cimini, LJ et al., "Optical Equalization to Combat the Effects of Laser Chirp and Fiber Dispersion", Journal of Lightwave Technology, US IEEE, New York, vol. 8, No. 5, May 1, 1990, pp. 649–659.

Madsen, C.K. et al., "Optical All–Pass Filters for Phase Response Design with Applications for Dispersion Compensation", IEEE Photonics Technology Letters, US, IEEE Inc., New York, vol. 10, No. 7, Jul. 1, 1998, pp. 994–996.

Madsen, C.K., "Efficient Architectures for Exactly Realizing Optical filters with Optimum Bandpass Designs", IEEE Photonics Technology Letters, US, IEEE Inc., New York, vol. 10, No. 8, Aug. 1, 1998, pp. 1136–1138.

K. Takiguchi et al. "Variable Group–Delay dispersion Equalizer Using Lattice–Form Programmable Optical Filter on Planar Lightwave Circuit", *IEEE Journal of Selected Topics in Quantum Electronics*, vol. 2, No. 2 pp. 270–276 (1996).

S. Dilwali et al. "Pulse Response of a Fiber Dispersion Equalizing Scheme Based on an Optical Resonator", *IEEE Photonics Techonolgy Letters*, vol. 4, No. 8, pp. 942–944 (1992).

K. D. Li et al "Broadband cubic–phase compensation with resonant Gires–Tournois interferometers", *Optical Letters*, vol. 14, No. 9, pp. 450–452 (1989).

K. L. Hall et al. "All–Optical Storgae of a 1.25kb Packet at 10Gb/s", *IEEE Photonics Technology letters*, vol. 7, No. 9, pp. 1093–1095 (1995).

(List continued on next page.)

*Primary Examiner*—Frank G. Font
*Assistant Examiner*—Layla Lauchman
(74) *Attorney, Agent, or Firm*—Lowenstein Sandler PC

(57) ABSTRACT

An all-pass optical filter which reduces the dispersion of optical pulses transmitted therethrough is disclosed. The all-pass optical filter reduces the dispersion of optical pulses by applying a desired phase response to optical pulses transmitted therethrough. The all-pass optical filter also has a frequency independent amplitude response. The all-pass optical filter has a structure which includes at least one feedback path, a splitter/combiner, an input port, and an output port.

18 Claims, 7 Drawing Sheets

OTHER PUBLICATIONS

C. K. Madsen et al. "A General Planar Waveguide Autoregressive Optical Filter", *Journal of Lightwave Tech.,* vol. 14, No. 3, pp. 437–447 (Mar. 1996).

C. K. Madsen et al. "Optical All–Pass Filters fior Phase Response Design with Applications for Dispersion Compensation", *IEEE Photonics Technology Letters,* vol. 10, No. 7, pp. 994–996 (Jul. 1998).

* cited by examiner

INPUT OPTICAL PULSE

OUTPUT OPTICAL PULSE

ALL-PASS OPTICAL FILTERS

FIELD OF THE INVENTION

The present invention relates generally to optical communication systems, and more particularly, to optical filters.

DESCRIPTION OF THE RELATED ART

Optical communication systems typically include a variety of devices (e. g., light sources, photodetectors, switches, optical fibers, modulators, amplifiers, and filters). For example, in the optical communication system 1 shown in FIG. 1, a light source 2 generates an optical signal 3. The optical signal 3 comprises a series of light pulses. The light pulses are transmitted from the light source 2 to a detector 5. Typically, an optical fiber 4 transmits the light pulses from the light source 2 to the detector 5. The optical fiber 4 has amplifiers (not shown) and filters (not shown) positioned along its length. The amplifiers and filters propagate the light pulses along the length of the optical fiber 4 from the light source 2 to the detector 5.

Optical communication systems are useful for transmitting optical signals over long distances at high speeds. For example, optical signals are routinely transmitted distances greater than about 60 kilometers at transmission speeds exceeding 1 Gbit/s (Gigabit/second).

As shown on the graph of FIG. 2A, an optical pulse 10 typically comprises a packet of waves, wherein each wave in the packet, denoted as 15, is within a frequency bandwidth of $\Delta f$. Additionally, each wave 15 in the packet is characterized by a plurality of different frequencies as well as a plurality of different amplitudes. An optical device or component (e. g., amplifiers, filters, and fibers) has an amplitude response and a phase response. The amplitude response describes the attenuation of each frequency in the optical pulse after transmission through the optical device relative to their attenuation before transmission through the optical device. The phase response determines the time delay, denoted as 17, for each frequency 15 in the packet of waves.

Many optical devices or components used for transmitting optical pulses apply a nonlinear phase response to the optical pulse. The nonlinear phase response changes the separation time between each frequency 15 of the packet of waves, causing each frequency 15 to be delayed for a different length of time. When each frequency 15 of the packet of waves is delayed for a different length of time, the optical pulse 10 output from such device or component is broadened and/or distorted, as shown on the graph of FIG. 2B. Broadening the optical pulse is undesirable because, depending on the time between optical pulses, the leading and trailing edges of the broadened pulse, denoted as 25, potentially interfere with the trailing edge of a previous optical pulse or the leading edge of a subsequent optical pulse, causing transmission errors. Devices or components in optical communication systems which broaden optical pulses are termed dispersive devices.

The dispersion of optical signals caused by the dispersive devices can be reduced with a dispersion compensating element. The term dispersion as used in this disclosure refers to the first and higher order derivatives of the group delay that are applied to the optical signal. The term group delay refers to the slope of the phase response at each frequency in the packet of waves. The dispersion compensating element applies a second dispersion to the optical signal which is the negative of the dispersion that was caused by the dispersive device. The second dispersion is additive with the dispersion applied by the dispersive device, so the net dispersion of the optical signal is about zero.

Dispersion compensating fibers and chirped fiber Bragg gratings are examples of fiber dispersion compensating elements. However, dispersion compensating fibers are lossy (~5–10 dB). Lossy fibers are undesirable because they potentially reduce the optical power of signals transmitted along their length. Many chirped fiber Bragg gratings typically only compensate for quadratic dispersion, limiting their utility to systems with quadratic dispersion. Also, chirped fiber Bragg gratings require a circulator for separating dispersion compensated optical signals from non-compensated optical signals. Additionally, chirped fiber Bragg gratings are long devices, making them expensive to integrate into optical communication systems.

Another dispersion compensating element, a dispersion equalizer, is described in Takiguchi, et al., "Variable Group-Delay Dispersion Equalizer Using Lattice-Form Programmable Optical Filter on Planar Lightwave Circuit", *IEEE J. of Quant. Elect.*, Vol. 2, No. 2, June 1996, pp. 270–276. The Takiguchi et al. dispersion equalizer is a filter which includes i+1 symmetrical Mach-Zehnder interferometers (MZIs) interleaved with i asymmetrical MZIs, where i is an integer. The term "symmetrical" as used in this disclosure means that the lengths of the two waveguide arms of the MZIs are the same, while the term "asymmetrical" means that the lengths of the two waveguide arms are different. While the Takiguchi et al. dispersion equalizers compensate for dispersion, the amplitude and phase responses are not independent. The result is that a frequency-dependent loss, introduced by the filter, potentially reduces the useable pass-band width of the filter. Additionally, the Takiguchi et al. dispersion equalizer is expensive and difficult to fabricate since a large number of symmetrical MZIs and asymmetrical MZIs are needed for dispersion compensation.

Moslehi et al. (U.S. Pat. No. 4,768,850) also describes a dispersion compensating filter. The dispersion compensating filter is a cascaded fiber optic lattice filter. The cascaded fiber optic filter uses a cascade of recursive and non-recursive fiber optic lattice filters to compensate for dispersion. However, the single-stage cascaded fiber optic lattice filters of Moslehi et al. are lossy (~20 dB). Since the Moslehi et al. devices are lossy, signal amplification is required for providing optical signals having adequate signal strengths for transmission along the optical fiber.

Dilwali, S. et al., "Pulse Response of a Fiber Dispersion Equalizing Scheme Based on an Optical Resonator", *IEEE Phon. Tech. Lett.*, Vol. 4, No. 8, pp 942–944 (1992) proposes the use of a single-stage fiber ring structure as a dispersion equalizer in optical fibers. However, dispersion compensation using a single stage fiber ring structure affects the useable pass-band of the filter, reducing it.

Li, K. D. et al., "Broadband Cubic-Phase Compensation with Resonant Gires-Tournois Interferometers", *Optics Lett.*, Vol. 14, No. 9, pp 450–452 (May 1989) discloses the use of Gires-Tournois interferometers (GTIs) for the dispersion compensation of ultrashort laser pulses. Each GTI includes two reflectors which are separated one from the other by a fixed distance. One reflector has a reflectivity of 100% and the other reflector has a reflectivity less than 100%. However, the GTI arrangement only provides moderate dispersion compensation to the ultrashort laser pulses, limiting the ability for transmitting optical signals at high bit rates.

Additionally, optical filters which apply time delays are useful for synchronizing bit streams of optical signals. For example, optical communication systems utilizing time division multiplexed (TDM) techniques (see Hall, K. L. et al., "All-Optical Storage of a 1.25 kbit Packet at 10 Gb/s", *IEEE Phon. Tech. Lett.*, Vol. 7, No. 9, pp. 1093–1095 (September 1995), require the synchronization of bit streams of optical signals to delay the propagation of some optical signals in time.

SUMMARY OF THE INVENTION

The present invention is directed to an all-pass optical filter. The all-pass optical filter reduces the dispersion of optical pulses transmitted therethrough. The all-pass optical filter reduces the dispersion of optical pulses by applying a desired phase response to optical pulses transmitted therethrough.

The desired phase response applies a frequency-dependent time delay to each frequency of each wave in the packet of waves contained in the optical pulse. Application of the frequency-dependent time delay to each frequency of each wave in the packet of waves contained in the optical pulse causes the total group delay of pulses transmitted through the all-pass optical filter to approximate a constant value. When the total group delay approximates a constant value, the dispersion of the optical pulse (first and higher order derivatives of the group delay) reduces to about zero.

The all-pass optical filter of the present invention also has a frequency independent amplitude response. That is, the amplitude of each frequency of the optical pulse transmitted through the all-pass optical filter is substantially preserved.

The all-pass optical filter of the present invention has a structure which includes at least one feedback path, a splitter/combiner, an input port, and an output port. The splitter/combiner is coupled to at least one of the feedback paths, the input port, and the output port. The splitter/combiner determines what portion of an input optical pulse is provided to the at least one feedback paths. Thereafter, the at least one feedback path applies the desired phase response to the optical pulses transmitted through the all-pass optical filter.

Each of the at least one feedback paths forms a loop having a path length. The path lengths of each feedback path are optionally different. Feedback paths with different path lengths are desirable because they potentially increase the free spectral range (FSR) of the all-pass optical filter. The term FSR as used in this disclosure refers to the period over which the phase response of the optical pulse repeats.

In one embodiment of the present invention, the feedback path of the all-pass optical filter has a ring resonator structure. The ring resonator structure includes one or more ring resonators where each of the ring resonators is a closed loop. The one or more ring resonators are optionally arranged as a ring cascade or as a series of coupled rings. The ring cascade couples a first ring resonator with a splitter/combiner and then the remaining ring resonators are coupled one to another. For the series of coupled rings, each ring is independently coupled to a splitter/combiner.

In an alternate embodiment of the present invention, the at least one feedback path of the all-pass optical filter includes a cavity and a plurality of reflectors. At least one reflector of the plurality of reflectors has a reflectivity of about 100%, while the remaining reflectors are partial reflectors with reflectivities less than 100%. Twice the length of the cavity determines the path length of the feedback path. The partial reflectors perform the functions of the splitter/combiner.

Another embodiment of the present invention uses a photonic band gap (PBG) structure as the feedback path of the all-pass optical filter. The photonic band gap (PGB) structure includes periodic layers of a material which confine a range of frequencies within such periodic layers. Defects formed in a 2-dimensional array of such layers (2-D PBG) provides a guided feedback path for optical pulses propagated therein. Point defects optionally formed at the edges of the 2-D PBG structure perform the functions of the splitter/combiner, coupling optical signals into and away from such feedback path.

A plurality of all-pass optical filters of the present invention are suited for use in an optical communication system. The plurality of all-pass optical filters are optionally arranged as a concatenated series.

The all-pass optical filter of the present invention is optionally suitable for delaying the transmission of optical pulses in time. The all-pass optical filter delays the transmission of optical signals by lengthening the time for optical pulses to be transmitted therethrough.

Other objects and features of the present invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

Figure 1:
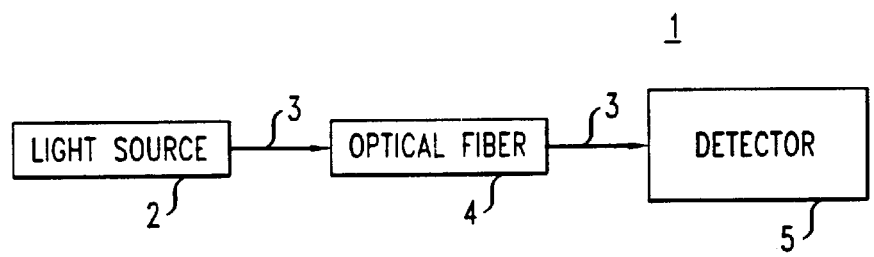
FIG. 1 shows an optical communication system including a light source, an optical filter, and a detector.
Figure 2A:
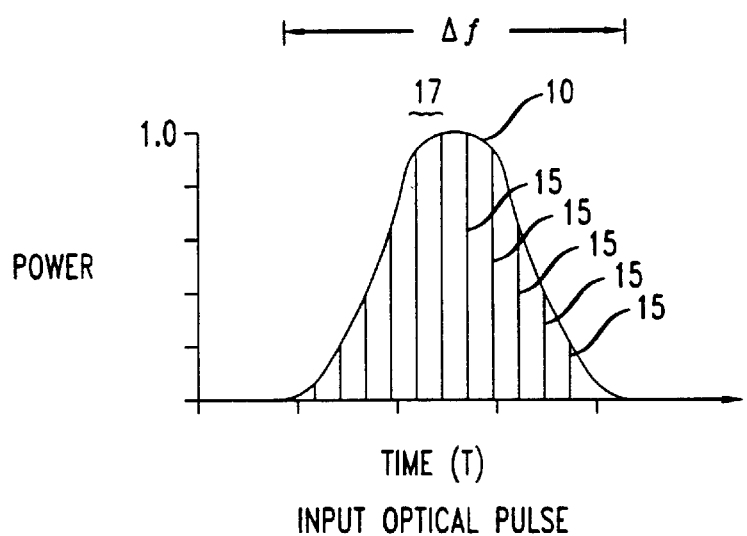
FIG. 2A is a graph of an optical pulse comprising a packet of frequencies, wherein each frequency in the packet is within a frequency bandwidth of $\Delta f$.
Figure 2B:
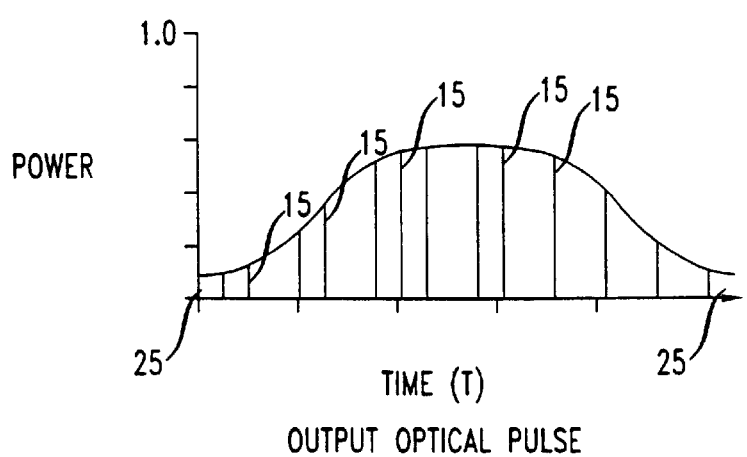
FIG. 2B shows a graph of the optical pulse of FIG. 2B after its propagation through a dispersive device.
Figure 3:
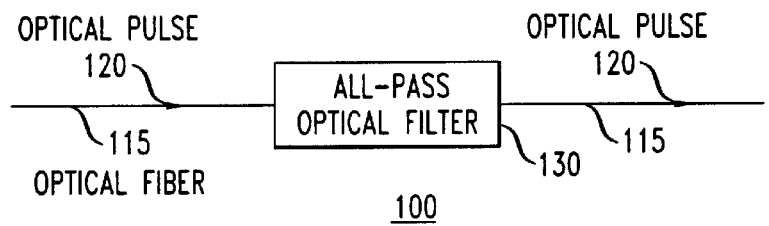
FIG. 3 shows an optical communication system including an all-pass optical filter of the present invention.

The present invention is directed to an all-pass optical filter. The all-pass optical filter is optionally included in an optical communication system 100. As shown in FIG. 3, optical communication system 100 includes an optical fiber 115 and an all-pass optical filter 130. Optical communication system 100 optionally includes a variety of devices (not shown) such as light sources, photodetectors, switches, modulators, amplifiers, and filters. The optical fiber 115 is coupled with the all-pass optical filter 130. An optical pulse 120 is transmitted in optical communication system 100. The optical pulse 120 contains a packet of frequencies. Each frequency of the packet of frequencies has an amplitude.

The optical pulse 120 transmitted in optical communication system 100 is input into the all-pass optical filter 130. The all-pass optical filter 130 reduces the dispersion of the optical pulses transmitted therethrough. The all-pass optical filter 130 reduces the dispersion of optical pulses by applying a desired phase response to optical pulses transmitted therethrough.

The desired phase response applies a frequency-dependent time delay to each frequency of each wave in the packet of waves contained in the optical pulse. Application of the frequency-dependent time delay to each frequency of each wave in the packet of waves contained in the optical pulse causes the total group delay of pulses transmitted through the all-pass optical filter to approximate a constant value. When the total group delay approximates a constant value, the dispersion of the optical pulse (first and higher order derivatives of the group delay) reduces to about zero.

The all-pass optical filter 130 of the present invention also has a frequency independent amplitude response. That is, the amplitude of each frequency of the optical pulse transmitted through the all-pass optical filter is substantially preserved.

Figure 4:
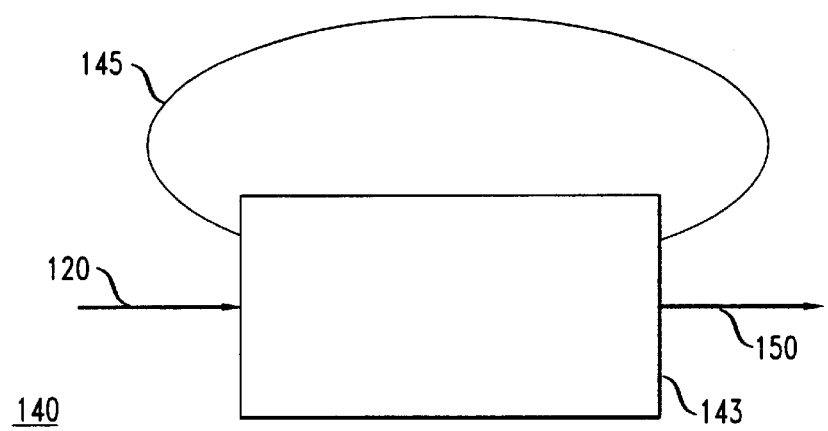
FIG. 4A shows an embodiment of the all-pass optical filter of the present invention including at least one feedback path, an input port, and an output port.
FIG. 4B shows an alternate embodiment of the all-pass optical filter of FIG. 4A including a plurality of feedback paths wherein one or more of the plurality of feedback paths includes an all-pass optical filter.
Figure 4:
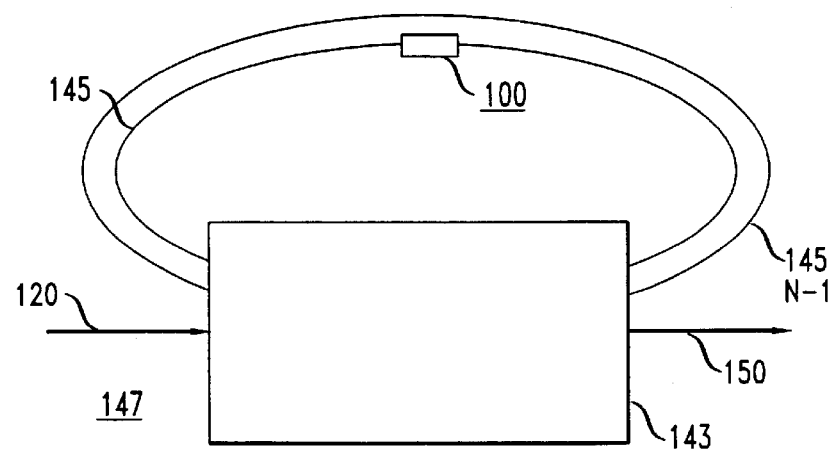

As shown in FIG. 4A, the all-pass optical filter 130 includes at least one feedback path 145, a splitter/combiner 143, an input port 140, and an output port 150. The splitter/combiner 143 is coupled with at least one feedback path 145, the input port 140, and the output port 150. The splitter/combiner 143 couples portions of the input optical pulse into and away from the feedback path 145.

When an optical pulse 120 enters the all-pass optical filter, a portion of the optical pulse is provided to the feedback path 145. The portion of the optical pulse provided to the feedback path 145, circulates repeatedly therein. However, at each pass of the optical pulse in the feedback path 145, some portion thereof is provided through the splitter/combiner 143 to the output port 150. Providing some portion of the optical pulse circulating in the feedback path 145 through the splitter/combiner 143 to the output port 145, incrementally reduces the portion of the optical pulse introduced into the feedback path 145, in effect removing it therefrom.

Coupling ratios for the splitter/combiner 143 and the feedback path 145 determine the portions of the optical pulse 120 that are coupled into and away from the feedback path 145. The magnitude of the coupling ratios for the splitter/combiner 143 and the feedback path 145 are a matter of design choice.

The length of the feedback path 145 is typically much shorter (about one order of magnitude) than the optical pulse length. Thus, as the input optical pulse 120 circulates repeatedly along the feedback path 145, it interferes with itself. That is, the leading edge portions of the optical signal circulating in the feedback path interfere with the trailing edge portions of the optical signal being input thereto. Interference between the leading and trailing edges of the optical pulse applies the frequency dependent time delay to each frequency contained therein.

An alternate embodiment of the all-pass optical filter of FIG. 4A including a plurality of feedback paths is shown in FIG. 4B. In FIG. 4B one or more of the plurality of feedback paths may include at least one all-pass optical filter 100. When an all-pass optical filter is included in a feedback path, the all-pass optical filter 100 applies a frequency dependent time delay to the portions of the optical signal circulating in the feedback path 145 independent from any frequency dependent time delay applied by the feedback path 145.

Figure 5:
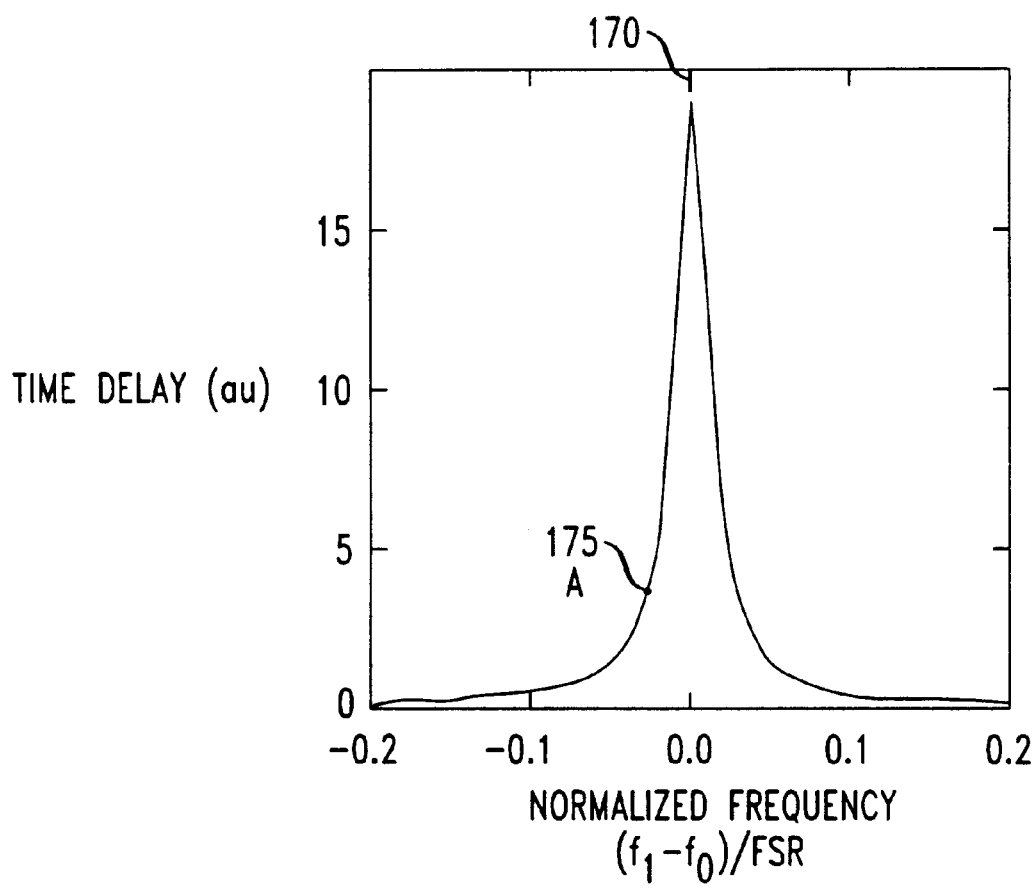
FIG. 5 is a plot showing the frequency dependent time delay applied by the feedback path of the all-pass optical filter to the packet of frequencies contained in the optical pulse.

FIG. 5 is a graph of the group delay of an all-pass optical filter having one feedback path. In FIG. 5, the normalized frequency, $(f_1-f_0)$/free spectral range (FSR), is plotted as a function of the time delay.

Frequencies in the packet of frequencies of the optical pulse that fit an integer number of wavelengths on the feedback path are termed resonant frequencies and have a normalized frequency equal to zero, denoted as 170 on the graph of FIG. 5. The maximum time delays are applied to the resonant frequencies 170. Frequencies that do not fit an integer number of wavelengths on the feedback path are termed off-resonant frequencies. Time delays less than the maximum time delays are applied to the off-resonant frequencies. For example, frequencies that are resonant frequencies 170 have a time delay of about 20 au (arbitrary units) applied thereto, while off-resonant frequencies located at a point A on the graph of FIG. 5, denoted as 175, with a normalized frequency of about −0.05 have a time delay of about 2.5 au applied thereto.

After the frequency dependent time delays are applied to each frequency of the optical pulse, the optical pulse is output from the all-pass optical filter through the output port 150.

Figure 6A:
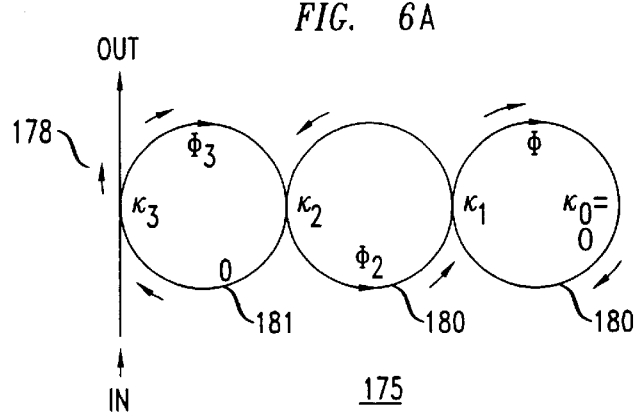
FIG. 6A illustrates an embodiment of the all-pass optical filter of the present invention wherein the feedback path includes a series of coupled rings.
Figure 6B:
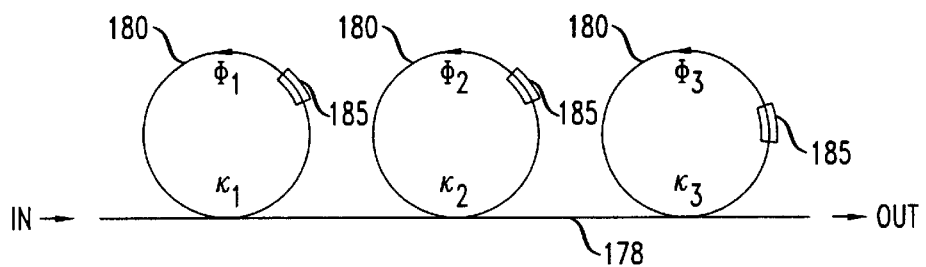
FIG. 6B illustrates an embodiment of the all-pass optical filter of the present invention wherein the feedback path has a ring cascade structure.

In one embodiment of the present invention, the at least one feedback path of the all-pass optical filter has a ring resonator structure, as shown in FIGS. 6A–6B. The ring resonator structure includes one or more ring resonators 180 wherein each of the ring resonators is a closed loop. The one or more ring resonators are optionally arranged as a ring cascade or as a series of coupled rings.

FIG. 6A depicts a structure with a series of coupled rings 175, wherein a first ring resonator 181 is coupled with the splitter/combiner 178 and then the remaining ring resonators 180 are coupled one to another. For the series of coupled ring resonators 175, the feedback path has a length which includes the length of each of the ring resonators 180, 181. Filter parameters such as the coupling coefficients, κ, for each ring, denoted as $\kappa_1$, $\kappa_2$, and $\kappa_3$, as well as the phase, $\phi$, of each ring resonator, denoted as $\phi_1$, $\phi_2$, and $\phi_3$, are also shown. The coupling coefficients and the phase of the ring resonators are determined based on the free spectral range (FSR) of the filter.

FIG. 6B shows the ring cascade structure, wherein each ring resonator 180 is independently coupled to a splitter/combiner 178. For the ring cascade structure, the feedback path has a length which includes the length of each of the ring resonators 180.

Figure 7A:
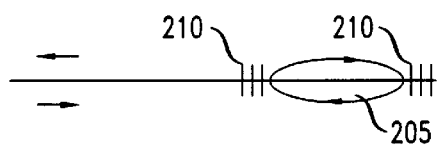
FIG. 7A illustrates an embodiment of the all-pass optical filter of the present invention wherein the feedback path combines a cavity with a plurality of reflectors, wherein at least one reflector has a reflectivity of about 100%.

In an alternate embodiment of the present invention, the at least one feedback path of the all-pass optical filter includes at least one cavity 205 and a plurality of reflectors 210, as shown in FIG. 7A. At least one of the plurality of reflectors 210 has a reflectivity of about 100%, while the remaining reflectors are partial reflectors with reflectivities less than 100%. Twice the length of the cavity 205 determines the path length of the feedback path. The partial reflectors perform the functions of the splitter/combiner.

Figure 7B:
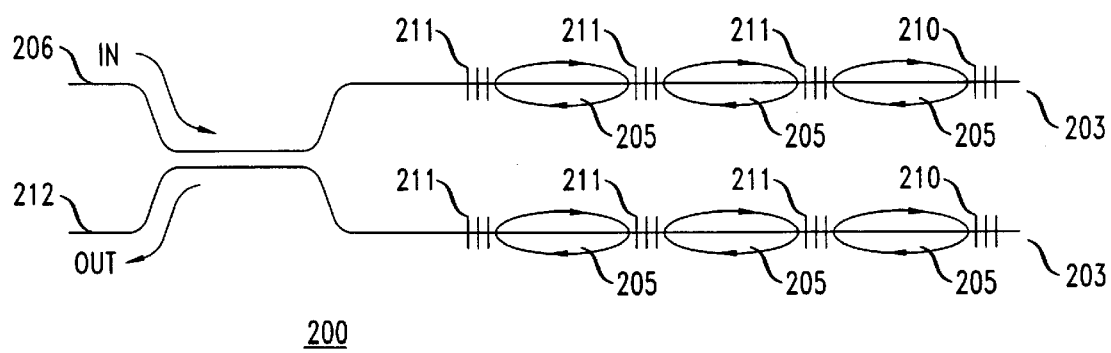
FIG. 7B illustrates an embodiment of the all-pass optical filter of the present invention wherein the feedback path includes a plurality of cavities and a plurality of reflectors.

Multiple feedback paths are optionally formed by combining a plurality of reflectors 210 and a plurality of cavities 205, as shown in the coupled cavity structure 200 of FIG. 7B. The coupled cavity structure 200 includes at least two arms 203. Each arm 203 contains a plurality of cavities 205 and a plurality of reflectors 210. The two or more arms of the coupled cavity structure provide separate paths for the input optical pulse and the reflected optical pulse. For example, as shown in FIG. 7B, input path 206 is separate from output path 212.

Figure 8:
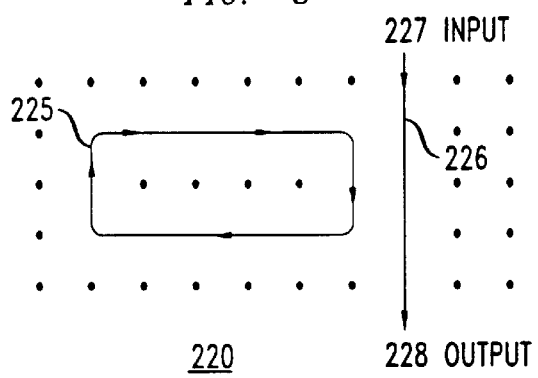
FIG. 8 illustrates an embodiment of the all-pass optical filter of the present invention wherein the feedback path includes a photonic band gap (PBG) structure.

Another embodiment of the present invention uses a photonic band gap (PBG) structure 220 as the feedback path of the all-pass optical filter, as shown in FIG. 8. FIG. 8 is a top view of the photonic band gap structure 220. The photonic band gap (PGB) structure includes periodic layers of a dielectric material which confine a range of frequencies within such periodic layers (not shown). Defects formed in a 2-dimensional array of such dielectric layers (2-D PBG) provides a guided feedback path 225 along which optical pulses are transmitted. Point defects (not shown) optionally formed at the edges of the 2-D PBG structure perform the functions of the splitter/combiner, coupling optical signals into and out of the feedback path.

The frequency-dependent time delay applied to the packet of frequencies contained in the optical pulse can be determined mathematically from the transfer function of the all-pass optical filter. For example, when the transfer function of the all-pass optical filter is:

$$H(z) = \frac{\prod_{k=1}^{N}(z_k^* - z^{-1})}{\prod_{k=1}^{N}(1 - z_k z^{-1})} \quad (1)$$

evaluated at $z = e^{j2\pi f/FSR}$ wherein $f$ is the optical frequency, and the normalized frequency is $f_N = f/FSR$. The splitter/combiner design sets the values for $z_k$, wherein $z_k < 1$. From equation (1), the all-pass optical filter has an amplitude response of $|H(f)| = 1$. Such an amplitude response for the all-pass optical filter means that all frequencies in the packet of frequencies pass through the filter without a change in their amplitudes. The phase response $\phi(f)$ of the all-pass filter is $$\phi(f) = \tan^{-1}\left[\frac{\text{Im}\{H(f)\}}{\text{Re}\{H(f)\}}\right] \quad (2)$$

wherein the frequency dependent time delay is determined from $$\tau(f) = \frac{-1}{2\pi}\frac{d\phi}{df}. \quad (3)$$

Typically, the time delay for the input optical pulse $[\tau_I(f)]$ is combined with the time delay applied by the all-pass optical filter $[\tau_{AP}(f)]$ so the time delay for the output optical pulse $\tau_O(f)$ is expressed as $$\tau_O(f) = \tau_I(f) + \tau_{AP}(f) \cong \text{constant}. \quad (4)$$

The dispersion is proportional to $$\frac{d\tau}{df},$$

so when the time delay of the output optical pulse, $\tau_O(f)$, approximates a constant value, the dispersion of the optical pulse is expressed as $$\frac{d\tau_o}{df} \cong 0 \quad (5)$$

Based on the dispersion of the input optical pulses determined from equation (4), the all-pass filter is designed. Filter parameters such as the number of stages (feedback paths), feedback path lengths, and splitter/combiner coupling ratios which best approximate $$-\tau_I(f) + \text{constant} \quad (6)$$

are used to design the all-pass optical filter. An optimization routine may be used to obtain design values which minimize a given error condition.

For example, in the Nth order all-pass optical filter having a ring resonator structure, the coupling ratios and the pole locations for each ring are calculated from the transfer function $$H(z) = e^{j\phi}(\rho e^{-j\phi} - z^{-1}/1 - \rho e^{j\phi}z^{-1}) \quad (7)$$

wherein the coupler path amplitude transmission is designated by $\rho = \sqrt{1-\kappa}$, where $\kappa$ is the coupling ratio of the ring resonator, and $\phi$ is a phase associated with one feedback path. The free spectral range (FSR) is given by $FSR \cong c/(n_e 2\pi R)$, where R is the ring radius, and $n_e$ is the effective index of the fundamental mode.

From equation (7), to produce a pole at $z_n$, for the structure shown in FIG. 6B, requires a coupling ratio of $\kappa_n = 1 - |z_n|^2$ and a phase response of $\phi_n = \arg(z_n)$. The rings are nominally the same circumference with an incremental length or index change added to each ring to realize the phase response, e.g.

$$\phi_n = \frac{2\pi\Delta nl}{\lambda} \text{ or } \phi_n = \frac{2\pi n \Delta l}{\lambda}.$$

Heaters 185, having a length, l, are optionally deposited on a section of the ring to locally change the incremental length and create the desired phase, as shown in FIG. 6B.

Figure 9A:
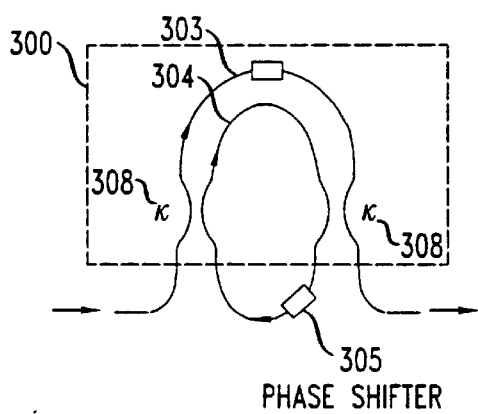
FIG. 9A illustrates an embodiment of the all-pass optical filter of the present invention wherein the feedback path has a Mach-Zehnder Interferometer structure with waveguide arms having different lengths.
Figure 9B:
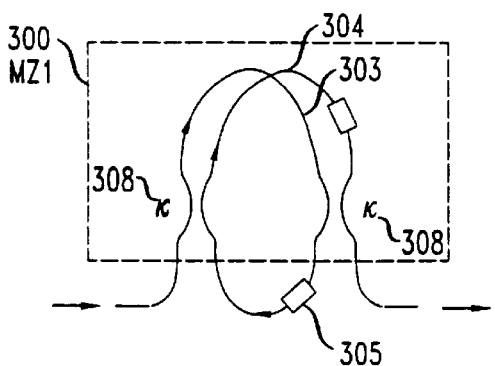
FIG. 9B illustrates an embodiment of the all-pass optical filter of the present invention wherein the feedback path has a Mach-Zehnder Interferometer structure with crossed waveguide arms that have about the same lengths.

Another embodiment of the all-pass optical filter of the present invention forms the feedback path from a Mach-Zehnder Interferometer (MZI) as shown in FIGS. 9A and 9B. The MZI structure shown in FIG. 9A has more than one coupler, denoted as 308. In the MZI structure 300, a phase shifter 305 is optionally used to tune the coupling of optical pulses into and out of the feedback path, providing a tunable all-pass optical filter. The couplers 308 are optionally identical. The MZI structures shown in FIGS. 9A–9B, are folded to minimize any increase in the feedback path length. In FIG. 9A, the MZI path lengths of waveguide arms 303, 304 are slightly different, but the difference is much smaller than the feedback path length. The slightly different feedback path length provides flexibility for designing wavelength dependent feedback coupling. Multiport MZIs, i.e. with greater than 2 arms, could also be used to further control the wavelength dependent feedback coupling.

In FIG. 9B, the path lengths of each arm 303, 304 are made substantially identical by crossing the waveguide arms. For such a structure, optical signal loss is reduced by increasing the crossing angle for the waveguide arms. Crossing the waveguide arms is desirable for large feedback coupling because the effective κ can be made large without affecting fabrication tolerances.

The all-pass optical filters of the present invention are suited for use in optical communication systems. For example, all-pass optical filters are suitable for use in optical communication systems which include multiplexers and/or demultiplexers. Coupling one or more all-pass optical filters to the front end of the multiplexer, reduces the dispersion of optical signals that are to be multiplexed. Conversely, coupling one or more all-pass optical filters to the back end of the demultiplexer, reduces the dispersion of optical signals after they are demultiplexed. In such systems, the one or more all-pass optical filters are optionally arranged as a concatenated series.

All-pass optical filters are also suitable for use in optical communication systems which include a gain equalizer filter (GEF). For example, coupling an all-pass optical filter to the front end of a gain equalizer filter optionally increases or decreases the amplitude of optical signals transmitted therethrough. Such an amplitude correction is important when transmitting optical signals between optical communication systems having different amplitude responses.

Optical systems such as WDM systems typically include multiple channels having multiple wavelengths (frequencies). In some WDM systems it is desirable to reduce the dispersion of each channel, separately. For example, many optical fibers have a dispersion slope around +0.08 ps/nm²-km. This means that the dispersion applied by the optical fiber to each channel is different. The problem is that even though the dispersion may be compensated perfectly at one wavelength, other wavelengths will have non-zero dispersion due to this dispersion slope. An all-pass filter can be designed to compensate the optical fiber's dispersion slope. For such an all-pass optical filter, the coupling ratios or partial reflectance values are varied gradually as a function of wavelength.

The all-pass optical filter of the present invention is optionally suitable for delaying the transmission of optical pulses in time. The all-pass optical filter delays the transmission of optical signals by lengthening the time delay of optical pulses transmitted therethrough.

The following examples are provided to illustrate a specific embodiment of the present invention.

EXAMPLE 1

An optical communication system includes an elliptical bandpass filter. The optical system is a WDM system with a channel spacing of about 100 GHz, a per channel bit rate of about 8 Gb/s, and a passband width of about 11 GHz. The elliptical bandpass filter has an amplitude response, denoted as 400 in FIG. 10A, as well as approximately parabolic group delay across the pass band, denoted as 405. FIG. 10B shows the effects of dispersion on a Gaussian pulse 415 after it has been transmitted through the elliptical bandpass filter.

A ring resonator structure is desired for the feedback path of the all-pass optical filter. The phase function for the elliptical bandpass filter and the all-pass optical filter are then determined as $$\tau_{BP}(f)+\tau_{AP}(f) \approx \text{constant}. \tag{8}$$

Based on the group delay for the input optical signals, the number of stages for the all-pass optical filter are determined. For this example, assume 4 stages. The all-pass optical filter's group delay response depends on its pole locations. Both a magnitude and a phase must be specified for each pole. The pole locations are determined from H(z) (see equation 1). An initial choice for the pole locations is made to start the optimization process. The pole locations are then varied to minimize an error criterion. The following error criterion was used $$E = \sum_{k=1}^{N} |\tau_{AP}(f_k) + \tau_{BP}(f_k) - \tau_{AP}(f_C) - \tau_{BP}(f_C)|^2 \tag{9}$$

where the passband is sampled at N points, $f_k$, and $f_c$ is the frequency at the center of the passband. (See also, Madsen, C. et al. "Optical All-Pass Filters for Phase Response Design with Applications for Dispersion Compensation", IEEE Phot. Technol. Lett., vol. 10, no. 7, pp. 994–996, July (1998) and also Madsen, C. et al., "A General Planar Waveguide Autoregressive Optical Filter", J. Light. Technol., vol. 14, no. 3, pp. 437–447, March (1996), which are hereby incorporated by reference).

The resulting filter parameters for the all-pass optical filter are given in TABLE 1. The filter parameters for both the coupled ring structure ($\kappa_L$, $\phi_L$) and the coupled cavity structure ($|\rho_L|$, $\phi_L+\pi+\angle\rho_L$) are listed. In TABLE 1, κ is the coupling ratio of the rings, φ is the phase of the rings or cavities, and ρ is the partial reflectance of the reflectors. TABLE 1 also includes the filter parameters for the cascade ring structure ($\kappa_C,\phi_C$) and the cavity structure ($|\rho_C|$, $\phi_C+\pi+\angle\rho_C$). The phases, φ, are given in radians.

TABLE 1

| Coupled | | | Cascade | | |
|---|---|---|---|---|---|
| $\kappa_L$ | $|\rho_L|$ | $\phi_L$ | $\kappa_C$ | $|\rho_C|$ | $\phi_C$ |
| 0.0000 | 1.0000 | 0.0000 | 0.2079 | 0.9027 | −0.0732 |
| 0.0133 | 0.9933 | 0.0000 | 0.2079 | 0.9027 | 0.0732 |
| 0.0284 | 0.9857 | 0.0000 | 0.1910 | 0.8923 | 0.2258 |
| 0.0848 | 0.9567 | 0.0000 | 0.1910 | 0.8923 | −0.2258 |
| 0.5894 | 0.6408 | | | | |

Figure 10A:
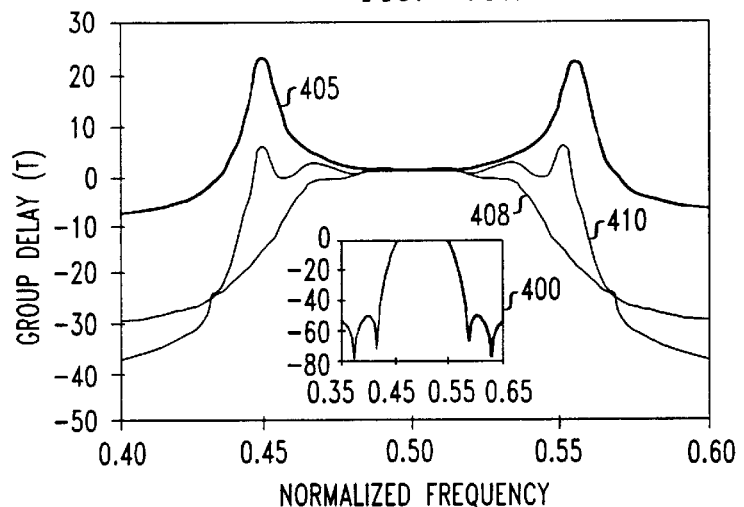
FIG. 10A is a graph showing the group delay of an elliptical bandpass filter and an all-pass filter plotted as a function of the normalized frequency.
Figure 10B:
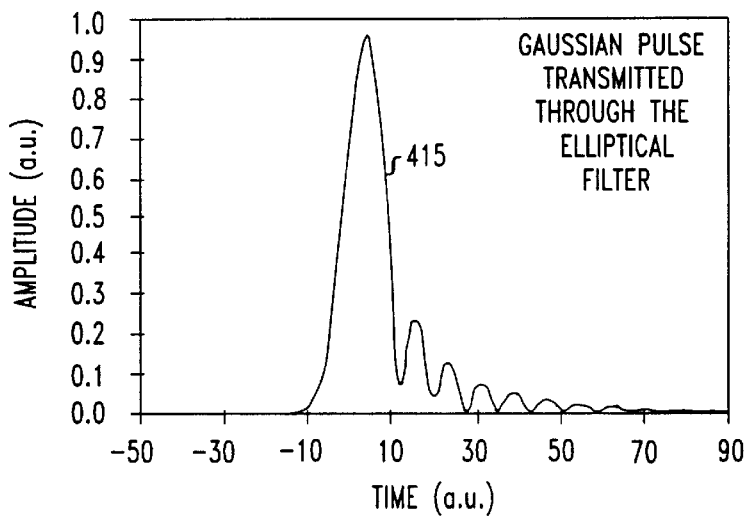
FIG. 10B is a graph showing the dispersion of a Gaussian pulse after it has been transmitted through the elliptical bandpass filter of Example 1.
Figure 10C:
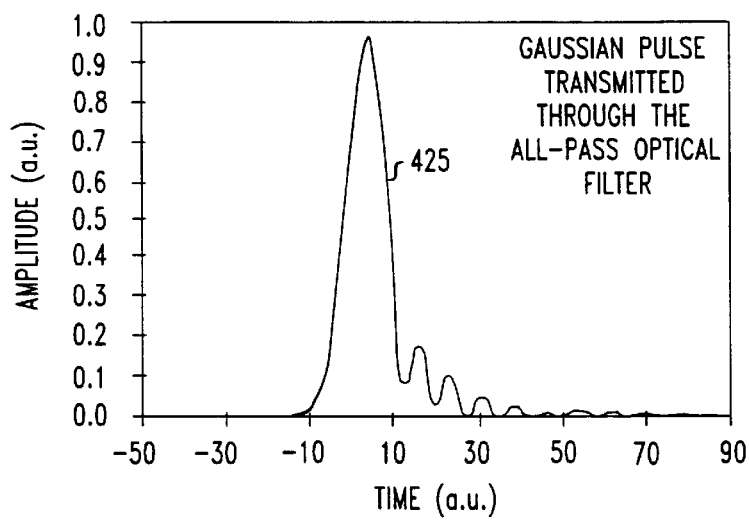
FIG. 10C is a graph of the Gaussian pulse of FIG. 10B after it has been transmitted through an all-pass optical filter of the present invention.

The all-pass optical filter has a group delay characteristic, denoted as 408 in FIG. 10A. When the Gaussian pulse having a pulse characteristic described by 415 is transmitted through the all-pass optical filter with the parameters described above, the dispersion of the resulting optical pulse 425, is reduced as shown in FIG. 10C.

EXAMPLE 2

All-pass optical filters are also usefull for delaying an optical pulse in time. A $4^{th}$ order all-pass filter is chosen to approximate a delay time of 16 au (arbitrary units) over the normalized frequency range of 0.4 to 0.6. The filter parameters for a cascade structure using either rings ($\kappa,\phi$) or cavities ($\rho,\phi+\pi+\angle\rho$) are shown in TABLE 2.

TABLE 2

| $|\rho|$ | $\kappa$ | $\phi$ |
|---|---|---|
| 0.8169 | 0.3326 | 2.7278 |
| 0.7721 | 0.4039 | 3.0009 |
| 0.8169 | 0.3326 | −2.7278 |
| 0.7721 | 0.4039 | −3.0009 |

Figure 11:
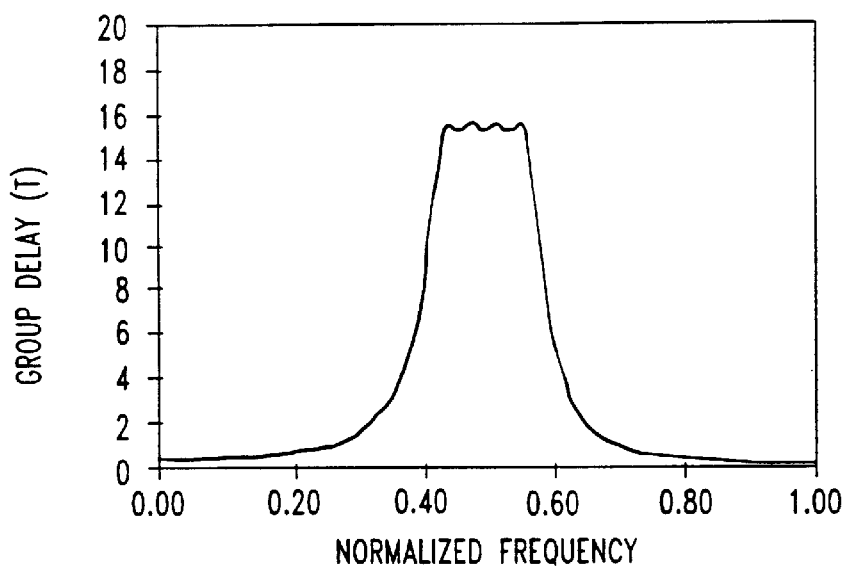
FIG. 11 shows a graph of the time delay applied to an optical pulse by the $4^{th}$ order all-pass optical filter described in Example 2.

The time delay for an all-pass optical filter with the parameters described above is shown in FIG. 11. The group delay applied to frequencies within the passband is essentially constant and much larger than the group delay applied to frequencies outside the passband.

EXAMPLE 3

An all-pass filter described below compensates for the dispersion slope of an optical fiber. The all-pass optical filter is designed to compensate the dispersion slope of 250 km of fiber over a 40 nm range. The difference in dispersion at 1525 nm and 1565 nm is designed to be 800 ps/nm, with the longest wavelength having the most negative dispersion. The FSR is chosen to be an integer multiple of the system channel spacing. For this example a value of 25 GHz is selected. The bandwidth over which the dispersion approximates a constant value is about 5 GHz. The all-pass optical filter parameters (phase, partial reflectors or couplers) are optimized at several wavelengths over the 40 nm range for the specific dispersion required at each wavelength. A set of filter parameters (one for each wavelength) are determined. The parameters are shown in TABLE 3 for a cavity structure. The phase values, $\phi$, of the all-pass optical filter were constrained to be constant to simplify fabrication requirements. For the reflector design the cavity phase is given by $\phi+\pi+\angle\rho$.

TABLE 3

| | WAVELENGTH | | | | |
|---|---|---|---|---|---|
| | 1525 | 1535 | 1545 | 1555 | 1565 |
| $|\rho1|$ | 0.000 | 0.005 | 0.067 | 0.132 | 0.175 |
| $|\rho2|$ | 0.031 | 0.098 | 0.117 | 0.143 | 0.202 |
| $|\rho3|$ | 0.096 | 0.207 | 0.247 | 0.280 | 0.299 |
| $\phi1$ | −1.992 | −1.992 | −1.992 | −1.992 | −1.992 |
| $\phi2$ | −1.534 | −1.534 | −1.534 | −1.534 | −1.534 |
| $\phi3$ | 2.981 | 2.981 | 2.981 | 2.981 | 2.981 |

Figure 12:
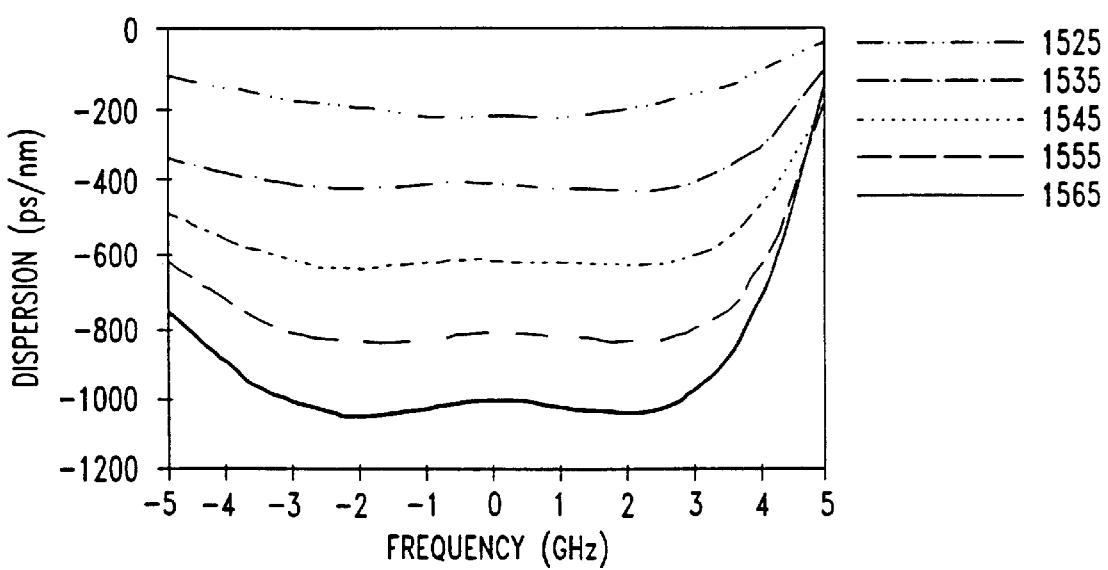
FIG. 12 is a graph which shows the dispersion correction applied to the wavelengths of the WDM system described in Example 3.

The resulting dispersion correction for each wavelength is shown on the graph of FIG. 12. For wavelengths near 1565 nm, the dispersion is about −1000 ps/nm. For wavelengths near 1525 nm, the dispersion is about −200 ps/nm. Thus, the all-pass optical filter compensates for the dispersion slope of the fiber.

The invention claimed is:

1. An all-pass filter for compensating dispersed signal pulses in an optical communication system, the filter comprising:
    a length of optical waveguide including an input port for receiving the dispersed signal pulses and an output port for the exit of compensated pulses;
    a splitter/combiner optically coupled to the waveguide between the input port and the output port;
    at least one feedback path optically coupled to the waveguide by the splitter/combiner, the splitter/combiner coupling input signal pulse light from the waveguide onto the feedback path and signal pulse light from the feedback path onto the waveguide toward the output,
    wherein light from a dispersed signal pulse coupled to the feedback path is returned to the waveguide to interfere with light in the dispersed pulse and thereby compensate dispersion in the pulse while substantially preserving the amplitude of each frequency in the pulse.

2. An optical communication system comprising one or more all pass filters according to claim 1.

3. The all-pass optical filter of claim 1 wherein the at least one feedback path of the all-pass optical filter comprises at least one ring resonator.

4. The all-pass optical filter of claim 3 wherein the at least one feedback path comprises a plurality of ring resonators arranged as a ring cascade.

5. The all-pass optical filter of claim 3 wherein the at least one feedback path comprises a plurality of ring resonators arranged as a series of coupled rings.

6. The all-pass optical filter of claim 1 wherein the at least one feedback path of the all-pass optical filter comprises one or more cavities and a plurality of reflectors, and wherein one reflector of the plurality of reflectors has a reflectivity of about 100%.

7. The all-pass optical filter of claim 6 wherein one or more reflectors in the plurality of reflectors is a partial reflector.

8. The all-pass optical filter of claim 1 wherein the at least one feedback path of the all-pass optical filter comprises a photonic band gap (PBG) structure.

9. The all-pass optical filter of claim 8 wherein the photonic bang gap structure includes a plurality of periodic layers of a dielectric material for confining the packet of frequencies of the optical pulse.

10. The optical communication system of claim 2 wherein the all-pass optical filters are arrange as a concatenated series.

11. A method of reducing the dispersion of optical pulses comprising the steps of:
    inputting an optical pulse into an all-pass optical filter, wherein the all-pass optical filter includes an input port, an output port, a splitter/combiner, and at least one feedback path, and wherein the input optical pulse contains a packet of frequencies, each frequency having an amplitude;
    applying a desired phase response to the optical pulse input to the all-pass optical; and
    transmitting the optical pulse out of the all-pass optical filter, wherein the amplitude of each frequency of the optical pulse transmitted through the all-pass optical filter is substantially preserved.

12. The method of claim 11 wherein the at least one feedback path of the all-pass optical filter comprises at least one ring resonator.

13. The method of claim 12 wherein the at least one feedback path comprises a plurality of ring resonators arranged as a ring cascade.

14. The method of claim 12 wherein the at least one feedback path comprises a plurality of ring resonators arranged as a series of coupled rings.

15. The method of claim 11 wherein the at least one feedback path of the all-pass optical filter comprises one or more cavities and a plurality of reflectors, and wherein one reflector in the plurality of reflectors has a reflectivity of about 100%.

16. The method of claim 15 wherein one or more of the reflectors in the plurality of reflectors is a partial reflector.

17. The method of claim 11 wherein the at least one feedback path of the all-pass optical filter comprises a photonic band gap (PBG) structure.

18. The method of claim 17 wherein the photonic band gap structure includes a plurality of periodic layers of a dielectric material for confining the packet of frequencies of the optical pulse.

* * * * *